United States Patent [19]
Schlund et al.

[11] Patent Number: 5,497,808
[45] Date of Patent: Mar. 12, 1996

[54] FLUID PRESSURE LINE PATCH

[76] Inventors: Jim D. Schlund, 230 Bob Barton Rd., Jerome, Id. 83338; Robert T. Reichel, 2444 Rock Creek Rd., Hansen, Id. 83334

[21] Appl. No.: 332,118

[22] Filed: Oct. 31, 1994

[51] Int. Cl.⁶ .................................... F16L 55/16
[52] U.S. Cl. ............................ 138/99; 138/97
[58] Field of Search ................. 138/99, 97, 98; 24/279

[56] References Cited

U.S. PATENT DOCUMENTS

| | | | |
|---|---|---|---|
| 1,619,287 | 3/1927 | Charter | 138/99 |
| 2,520,802 | 8/1950 | Hampton | 138/99 |
| 2,529,411 | 11/1950 | Northrup | 138/99 |
| 2,850,045 | 9/1958 | Soehnlen et al. | 138/99 |
| 4,086,934 | 5/1978 | Bagwell et al. | 138/99 X |
| 4,109,697 | 8/1978 | Wolfe | 138/99 X |
| 5,002,094 | 3/1991 | Brovont | 138/99 X |
| 5,123,451 | 6/1992 | Savard | 138/99 |
| 5,219,001 | 6/1993 | Rennaker | 138/99 |
| 5,247,967 | 9/1993 | Bourque | 138/99 |

*Primary Examiner*—David Scherbel
*Assistant Examiner*—Patrick F. Brinson
*Attorney, Agent, or Firm*—Korfanta & Dunbar

[57] ABSTRACT

A line patch for use in repairing ruptures or leaks in fluid-carrying cylindrical pipes. One or more screw clamps, encircling a curved compression sleeve, are used to compress a resilient sealing member against a pipe rupture. For smaller diameter pipe (approximately less than one inch) applications, the compression sleeve has an inner lip which forms an abutment seat for the sealing member, which is an O-ring made of a resilient material such as rubber. In larger diameter pipe (greater than one inch) applications, the compression sleeve is a curved plate of constant thickness designed to approximate the outer curve of the pipe to be repaired, and the sealing member is a sheet of constant thickness resilient material. In the preferred embodiment, the screw clamp is a common hose clamp, the compression sleeves are made of metal, and the sealing members are made of rubber.

4 Claims, 2 Drawing Sheets

FLUID PRESSURE LINE PATCH

BACKGROUND OF THE INVENTION

1. Technical Field

This invention generally relates to fluid-carrying pipes or lines. More particularly, this invention relates to a device for quickly repairing ruptures or leaks in fluid-carrying pipes.

1. Background

Many situations exist in which fluid-carrying pipes or lines must be quickly and securely repaired. These pipes include pneumatic, hydraulic, water supply, gas supply, and various automotive lines, in both household and industrial applications. Often, ruptures in these lines must be repaired immediately on the spot or in the field, without the benefit of specialized equipment or skilled labor.

An object of the present invention is to provide a quick, easy and inexpensive means of repairing ruptures in fluid lines without specialized equipment or expertise. A further object of the present invention is to provide a means for repairing ruptures in fluid lines such that the repair will be leakproof, against both low and high-pressure fluids, both temporarily and, when necessary, over the long term.

DISCLOSURE OF INVENTION

These objects, along with others, are accomplished by means of a patch device which compresses a resilient sealing member between the outer surface of a ruptured cylindrical pipe and the inner surface of a compression sleeve by means of a screw clamp, thereby sealing the rupture. The device has two general embodiments, one for use in repairing ruptures in pipes of smaller diameter, i.e., one inch (2.54 centimeters) or less, and one for use in repairing ruptures in pipes of larger than a one inch diameter.

For smaller diameter pipes, the compression sleeve is a plate curved to generally match the outside curve of the pipe to be repaired. The compression sleeve has a short wall or lip protruding inward along its edge and forming an abutment, or seat, for the sealing member. The sealing member for smaller pipe applications is an O-ring made of a resilient material, such as rubber. The O-ring fits inside the compression sleeve along the lip and the entire assembly is clamped against the pipe at the rupture spot by use of the screw clamp.

For larger pipe (one inch or greater) applications, the compression sleeve is a curved, constant thickness plate circularly arcuate in cross section. The sealing member is a sheet of constant thickness resilient material, such as rubber. The compression sleeve is used to press the resilient sealing member against the pipe at the rupture point under the action of one or more screw clamps, the number of clamps depending upon the longitudinal length of the compression sleeve. In both small and larger diameter pipe applications, the compression sleeves are typically made of metal. The screw clamps for both applications are common hose clamps.

BEST MODE FOR CARRYING OUT INVENTION

Figure 1:
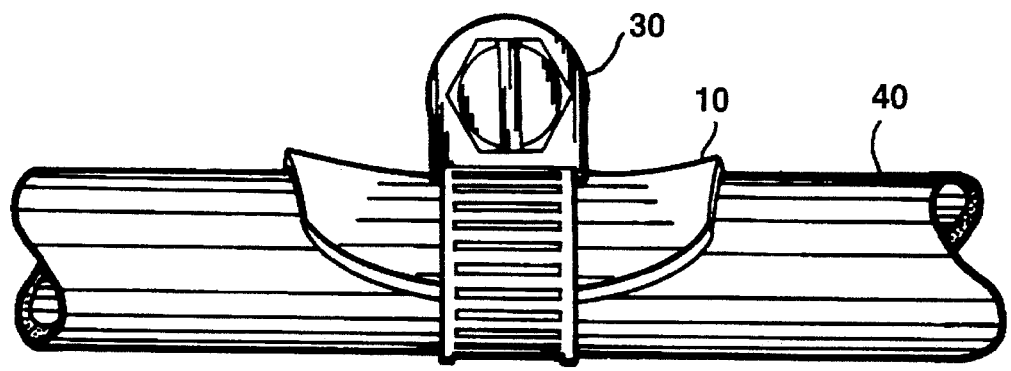
FIG. 1 is an elevation view showing an embodiment of the line patch for smaller pipes applied to a pipe.
Figure 2:
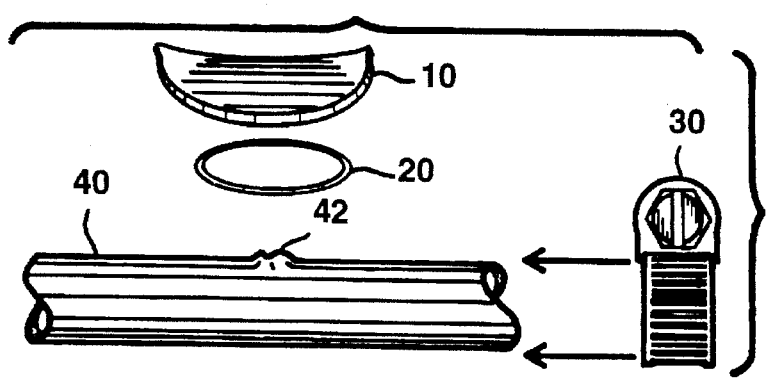
FIG. 2 is an exploded view of the line patch shown in FIG. 1, showing elevation views of the pipe to be repaired, the sealing member (or O-ring), the compression sleeve, and the screw clamp.
Figure 3:
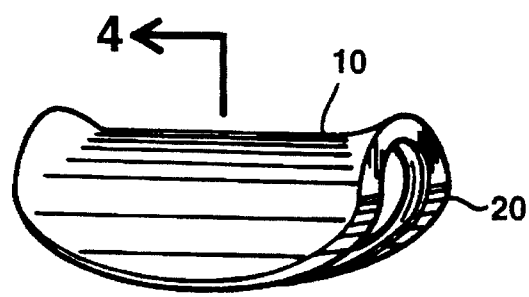
FIG. 3 is a perspective view of the compression sleeve for smaller pipes with seated sealing member (or O-ring).
Figure 4:
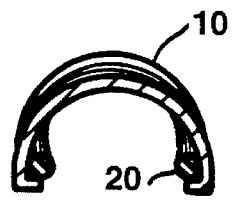
FIG. 4 is a cross sectional view of the compression sleeve and O-ring of FIG. 3.
Figure 5:
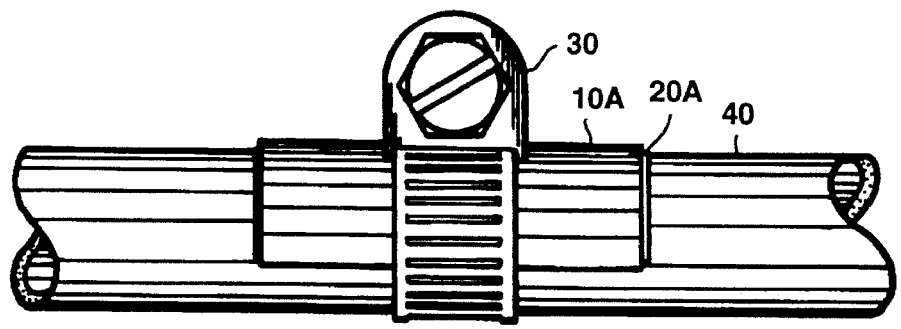
FIG. 5 is an elevation view showing an embodiment of the line patch for larger pipes applied to a pipe.
Figure 6:
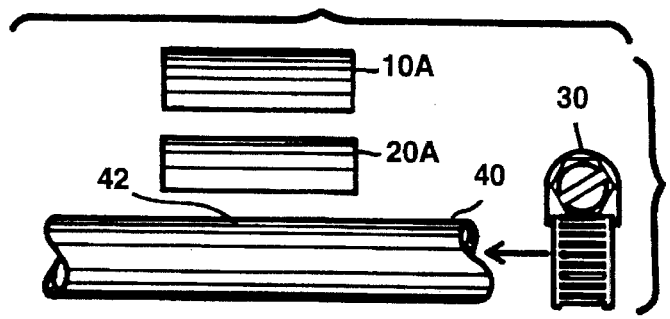
FIG. 6 is an exploded view of the line patch shown in FIG. 5, showing elevation views of the pipe to be repaired, the sealing member, the compression sleeve and the screw clamp.
Figure 8:
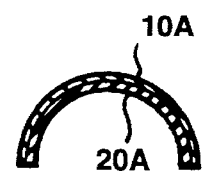
FIG. 8 is a cross sectional view of the compression sleeve and the sealing member of FIG. 7.
Figure 7:
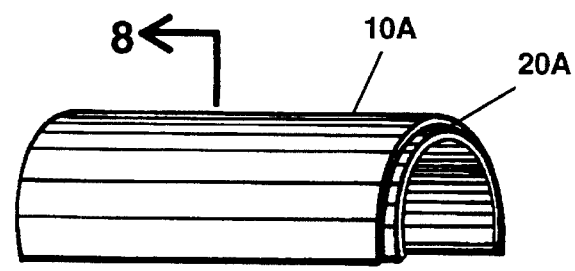
FIG. 7 is a perspective view of the sealing member and compression sleeve for larger pipes with sealing member in place.

Referring to FIGS. 1 and 2, the fluid carrying pipe 40 is a cylinder having inner and outer surfaces. The pipe 40 may be rigid or flexible and may be made of a variety of materials, such as plastic, PVC or metal, and may be in household, automotive or industrial use. The pipe 40 may carry a variety of fluids, such as air, oil, water, gas or others. In all cases, the pipe 40 has a rupture 42 that needs repairing.

Reference is now had to FIGS. 1, 2, 3 and 4, which depict various features of the line patch for smaller pipes, i.e., pipes of a diameter of approximately one inch (2.54 centimeters) or less. In the preferred embodiment, the compression sleeve 10 for smaller pipes is a curved plate or annulus, whose radius of curvature generally matches, or is slightly larger than, the outer surface radius of the pipe to be repaired. The compression sleeve 10 has, along its entire edge, a short wall or lip protruding inward toward the sleeve center of curvature and forming an abutment or seat against which the sealing member or O-ring 20 sits. The compression sleeve 10 may be made of a variety of hard materials, such as plastic, but in the preferred embodiment it is made of a metal, such as steel.

Referring to again to FIGS. 1, 2, 3 and 4, for smaller pipes the sealing member 20 is an O-ring. The O-ring 20 may be formed of a variety of resilient or deformable materials, such as rubber, teflon or plastic. However, in the preferred embodiment, the O-ring is made of rubber. The O-ring 20 forms a tight seal around the rupture 42 when the compression sleeve 10 is compressed around the seal under the action of screw clamp 30.

Screw clamp 30 is a common metal hose clamp used in a variety of household, automotive and industrial applications. The screw clamp 30 circumferentially surrounds the pipe 40 and compression sleeve 10, and forces compression sleeve 10 in toward the pipe 40, compressing sealing member 20 around the rupture, thus forming a seal.

Referring now to FIGS. 5, 6, 7 and 8, which depict the line patch for larger diameter pipes, i.e., pipes of a diameter which is greater than approximately one inch, it is seen that the compression sleeve 10A and sealing member 20A are somewhat different than their embodiments for smaller diameter pipe applications, wherein these parts are denoted as compression sleeve 10 and sealing member 20, respectively, in FIGS. 1, 2, 3 and 4. Here, sleeve 10A is an annulus of constant thickness, circularly arcuate in cross section. The compression sleeve 10A may be of various circular arc lengths in cross section, though usually less than semicircular. As in the smaller diameter pipe embodiment, the compression sleeve 10A may be constructed of a variety of materials. Preferably, however, the material is hard and in the preferred embodiment, a metal such as steel is used.

The sealing member 20A is a simple lamina of constant thickness made of a resilient material such as rubber, plastic, teflon or otherwise. In the preferred embodiment, the sealing member 20A is made of rubber.

Figure 9:
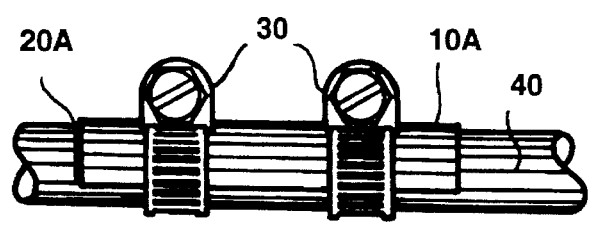
FIG. 9 is an elevation view of an embodiment of the line patch for larger pipes showing the use of two screw clamps.

As in the smaller diameter pipe embodiment, the screw clamp 30 is fitted over the compression sleeve 10A and pipe 40 and then tightened to cause the sealing member 20A to be tightly squeezed between the compression sleeve 10A and pipe 40, thereby forming a tight seal around the rupture 42. Depending on the length of the sleeve 10A along the pipe longitudinal axis, two or more screw clamps 30 may be used to provide sufficient clamping action to provide a strong seal around the rupture 42. FIG. 9 shows an embodiment of the line patch with two screw clamps 30 utilized.

While there is shown and described the present preferred embodiment of the invention, it is to be distinctly understood that this invention is not limited thereto but may be variously embodied to practice within the scope of the following claims.

I claim:

1. A device to be applied to a rupture in a fluid-carrying cylindrical pipe to give an effective seal with an outer surface of the pipe to protect against leakage, comprising:

a compression sleeve having inner and outer surfaces, the inner surface curved to generally match the curve of the outer surface of the pipe, the compression sleeve sized to cover less than one half of the pipe circumference wherein the compression sleeve has a lip along its edge protruding inward toward the sleeve's center of curvature and forming an abutment seat for a sealing member;

a sealing member interleaved between said compression sleeve inner surface and the outer surface of said pipe wherein the sealing member is an O-ring abutted and seated against the compression sleeve and lip and extending beyond the lip: and a screw clamp being sized to encircle said compression sleeve's outer surface and said pipe.

2. The device of claim 1 wherein the O-ring is made of rubber.

3. The device of claim 2 wherein the screw clamp is a common hose clamp.

4. The device of claim 1 wherein the compression sleeve is constructed of metal.

* * * * *